(12) United States Patent
Lee et al.

(10) Patent No.: US 10,711,823 B2
(45) Date of Patent: Jul. 14, 2020

(54) SPRING WASHER FOR TURBO CHARGER

(71) Applicant: DongAh Manufacturing Corp., Gyeonggi-do (KR)

(72) Inventors: Jong Seon Lee, Gyeonggi-do (KR); Jae Kyu Jang, Gyeonggi-do (KR); Doo Kwang Kim, Gyeonggi-do (KR)

(73) Assignee: DongAh Manufacturing Corp, Gyeonggi-do (KR)

( * ) Notice: Subject to any disclaimer, the term of this patent is extended or adjusted under 35 U.S.C. 154(b) by 251 days.

(21) Appl. No.: 16/004,231

(22) Filed: Jun. 8, 2018

(65) Prior Publication Data

US 2019/0195270 A1 Jun. 27, 2019

(30) Foreign Application Priority Data

Dec. 21, 2017 (KR) .................. 10-2017-0176743

(51) Int. Cl.
*F16B 39/26* (2006.01)
*F01D 17/10* (2006.01)
*F16B 43/00* (2006.01)

(52) U.S. Cl.
CPC ............ *F16B 39/26* (2013.01); *F01D 17/105* (2013.01); *F16B 43/00* (2013.01); *F05D 2220/40* (2013.01); *F05D 2240/70* (2013.01)

(58) Field of Classification Search
CPC .......... F16B 39/14; F16B 39/26; F16B 39/34; F16B 39/36; F16B 43/00; F16B 43/002; F01D 17/105; F05D 2220/40; F05D 2240/70

USPC .................. 411/531, 538, 544, 546, 547
See application file for complete search history.

(56) References Cited

U.S. PATENT DOCUMENTS

| 1,721,326 A | * | 7/1929 | Wilson ............... F16B 43/00 277/649 |
| 1,963,535 A | * | 6/1934 | Trotter ............... F16B 39/24 411/156 |
| 2,130,546 A | * | 9/1938 | Hovey ............... E04B 5/10 403/387 |

(Continued)

FOREIGN PATENT DOCUMENTS

KR 10-1251536 4/2013

*Primary Examiner* — Roberta S Delisle
(74) *Attorney, Agent, or Firm* — Intellectual Property Law Group LLP (57) ABSTRACT

The present invention provides a spring washer for a turbocharger including a stopper part formed at an inner periphery there and a line contact part formed at an outer periphery thereof, thus to prevent a spring repulsive force from being exerted thereto more than necessary even when exerting excessive compression and continuous compression force from peripheral parts, and prevent an inclination bent section from being flattened, thereby maintaining or improving restoring characteristics of the inclination bent section. The ring-shaped spring washer installed in a bypass valve of a turbocharger includes: an inner periphery having a stopper part fixed to a lower surface thereof with being overlapped therewith; an inclination bent section integrally formed with the inner periphery with being inclined downward; and an outer periphery having a line contact part integrally formed with the inclination bent section to be in line contact with a support of the spring washer.

9 Claims, 6 Drawing Sheets

(56) References Cited

U.S. PATENT DOCUMENTS

| | | | | |
|---|---|---|---|---|
| 2,927,495 | A | * | 3/1960 | Barwood .............. F16B 43/001 |
| | | | | 411/371.1 |
| 3,992,974 | A | * | 11/1976 | Miki .................... F16B 31/028 |
| | | | | 411/544 |
| 5,407,313 | A | * | 4/1995 | Bruins ................... E04D 5/143 |
| | | | | 411/369 |
| 5,415,511 | A | * | 5/1995 | Damron ................. E04D 5/142 |
| | | | | 411/155 |
| 6,939,097 | B2 | * | 9/2005 | Carr ....................... F16B 43/00 |
| | | | | 411/155 |
| 7,326,017 | B2 | * | 2/2008 | Winker ................... F16B 37/00 |
| | | | | 411/533 |
| 9,689,417 | B2 | * | 6/2017 | Stewart ................ F16B 31/028 |
| 9,879,369 | B2 | * | 1/2018 | Timac ................... D06F 37/262 |
| 2010/0326006 | A1 | * | 12/2010 | Yaros ..................... E04D 5/145 |
| | | | | 52/711 |

* cited by examiner

SPRING WASHER FOR TURBO CHARGER

CROSS-REFERENCE TO RELATED APPLICATIONS

This application claims priority to Korean Patent Application No. 10-2017-0176743, filed on Dec. 21, 2017 in the Korean Intellectual Property Office, the entire disclosure of which is incorporated herein by reference.

BACKGROUND OF THE INVENTION

1. Field of the Invention

The present invention relates to a spring washer installed in a bypass valve of a turbocharger, and more particularly, to a spring washer for a turbocharger capable of reducing or eliminating vibration and noise generated during operating the bypass valve.

2. Description of the Related Art

Typically, an exhaust gas turbocharger of an internal combustion engine drives a compressor with a turbine rotated by an exhaust gas to compress an intake air and feed it into cylinders. At this time, in order to control a boost pressure within a certain range, the turbocharger has a bypass flow path provided from an exhaust gas inlet passage to an exhaust gas outlet passage thereof, and a bypass valve is provided in the bypass flow path to open and close the same. Therefore, when opening the bypass valve, a part of the exhaust gas is supplied to the exhaust gas outlet passage through the opened exhaust gas inlet passage via the bypass flow path while not passing through the turbine.

In general, the turbocharger includes the bypass valve installed on the bypass flow path for allowing a part of the exhaust gas to bypass the turbine in an exhaust gas discharge passage from the exhaust manifold of the engine to the exhaust gas pipe, and an actuator for operating the bypass valve installed in the bypass flow path. During operating the bypass valve by the actuator, the bypass flow path is opened to directly supply a portion of the exhaust gas to the exhaust gas outlet passage by bypassing the turbine. In order to realize this system, the bypass valve is connected to the actuator through a link, and a driving force of the actuator is transmitted to the bypass valve through the link as shown in FIGS. 1 and 2.

Figure 1:
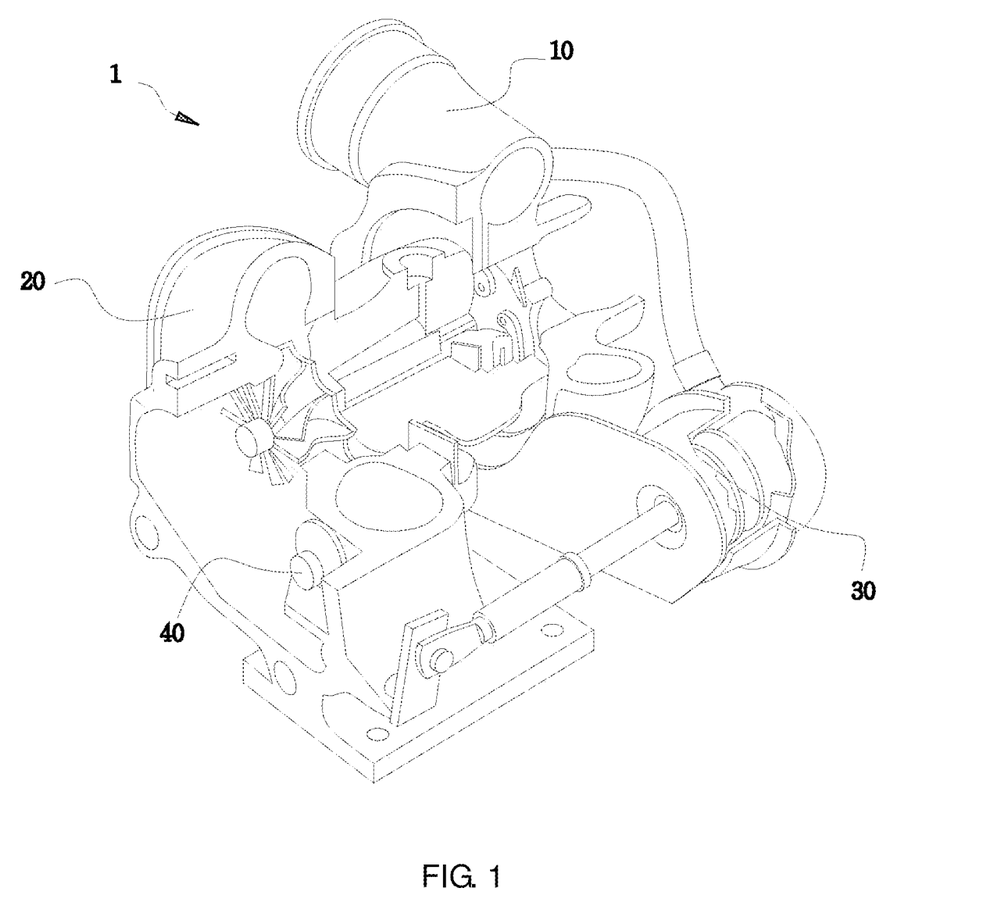
FIG. 1 is a schematic view showing a configuration of a conventional typical turbocharger.
Figure 2:
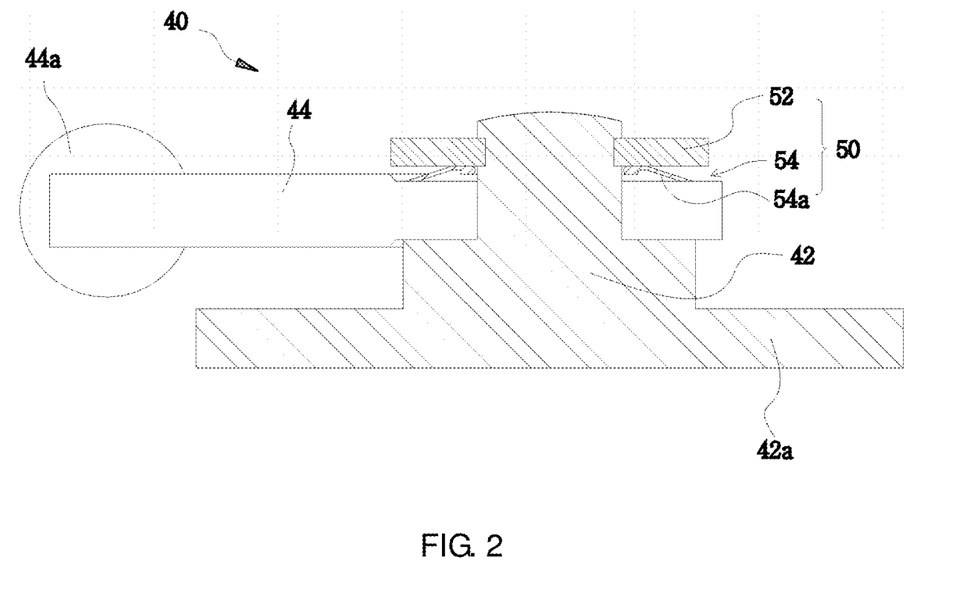
FIG. 2 is a cross-sectional view for illustrating a configuration of an example of a bypass valve in the turbocharger of FIG. 1.

FIG. 1 is a schematic view showing a configuration of a typical turbocharger, and FIG. 2 is a cross-sectional view for illustrating a configuration of an example of a bypass valve in the turbocharger of FIG. 1

A turbocharger 1 includes a compressor housing 10, a turbine housing 20, an actuator 30, and a bypass valve 40 installed near the turbine housing 20 and connected to the actuator 30 by a link.

As shown in FIG. 2, the bypass valve 40 generally includes a valve body 42, a support 44, and a washer unit 50. The valve body 42 has an open/close plate 42a integrally formed at a lower end thereof to open and close the bypass flow path.

The support 44 is connected to the valve body 42, and a rotation end 44a extending from the valve body 42 is formed at one end thereof.

The washer unit 50 includes a washer 52 fixed to an engaging groove formed at an upper end of the valve body 42 by a rivet, and a spring washer 54 mounted between a lower portion of the washer 52 and the support 44.

Herein, the spring washer 54 is made of a metal material having elastic and heat resistance properties so as to limit a movement and a clearance of the support 44. Further, the spring washer 54 has elasticity by a bead 54a which is formed in a ring shape with being inclined upward to a center thereof.

However, in the spring washer 54 having the above-described structure, when exerting excessive compression and continuous compression force from peripheral parts, the inclined portion of the bead 54a that maintains a spring repulsive force is excessively expanded, such that the spring washer does not exhibit an original elastic function.

As an example of prior arts, Korean Patent Registration No. 10-1251536 (published on Apr. 5, 2013) discloses a noise reduction washer and a noise reduction system for a waste gate valve apparatus. However, the patent has not solved the above-described problem.

SUMMARY OF THE INVENTION

In consideration of the above-mentioned circumstances, it is an object of the present invention to provide a spring washer for a turbocharger, which includes a stopper part formed at an inner periphery of a ring-shaped spring washer and a line contact part formed at an outer periphery thereof, thus to prevent a spring repulsive force from being exerted thereto more than necessary even when exerting excessive compression and continuous compression force from peripheral parts, and prevent an inclination bent section from being flattened, thereby maintaining or improving restoring characteristics of the inclination bent section.

In order to achieve the above object, according to an aspect of the present invention, there is provided a ring-shaped spring washer installed in a bypass valve of a turbocharger, including: an inner periphery which has a stopper part bent and fixed to a lower surface thereof so as to be overlapped therewith; an inclination bent section which is integrally formed with the inner periphery by extending therefrom with being inclined downward; and an outer periphery which has a line contact part integrally formed with the inclination bent section by extending downward therefrom so as to be in line contact with and supported by a support of the spring washer.

According to an embodiment of the present invention, the stopper part may be fixed to the lower surface of the inner periphery in such a way that a piece of the same material as the inner periphery is laminated in the same area and is welded thereto.

According to an embodiment of the present invention, the stopper part may be formed on the lower surface of the inner periphery in such a way that a portion extending therefrom is bent downward and is again bent at a right angle, so that an upper surface of the stopper part is in close contact with the lower surface of the inner periphery.

According to an embodiment of the present invention, the stopper part may be formed on the lower surface of the inner periphery with a gap in such a way that a portion extending therefrom is bent downward and is again bent at a right angle, so that an upper surface of the stopper part faces the lower surface of the inner periphery with being spaced apart therefrom.

According to an embodiment of the present invention, the ring-shaped spring washer may further include a bent part which is formed integrally with the line contact part by extending therefrom with being bent upward, and the bent part may be formed in an obtuse angle range.

In accordance with the spring washer of the turbocharger according to the present invention, by the stopper part welded or bent so as to be overlapped at the ring-shaped inner periphery and the line contact part formed at the outer periphery, it is possible to maintain the spring repulsive force at a constant level or more even when exerting excessive compression and continuous compression force from the peripheral parts.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF SPECIFIC EMBODIMENTS

Hereinafter, exemplary embodiments of the present invention will be described in detail. The following embodiments are described in order to enable those of ordinary skill in the art to embody and practice the present invention. However, the present invention is not limited to the embodiments disclosed below, but can be implemented in various forms. To aid in understanding the present invention, like numbers refer to like elements throughout the description of the drawings, and the description of the same elements will not be described.

In the specification of the present invention, when the explanatory phrase a part "includes" a component is used, this means that the part may further include the component without excluding other components, so long as special explanation is not given.

Figure 3A:
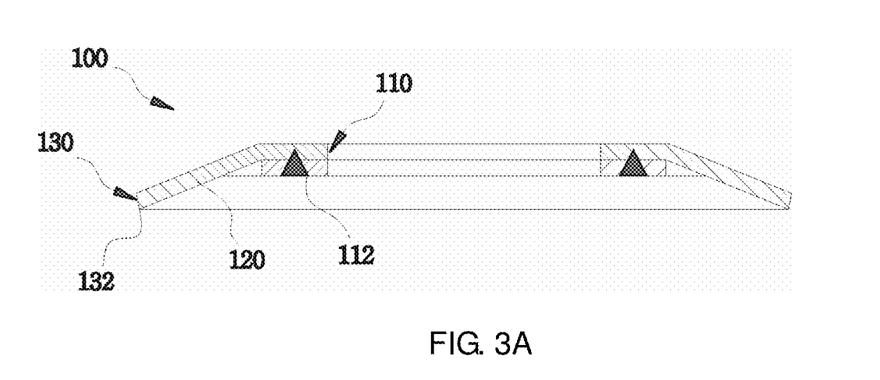
FIGS. 3A and 3B are cross-sectional views of a spring washer according to a first embodiment of the present invention.
Figure 3B:
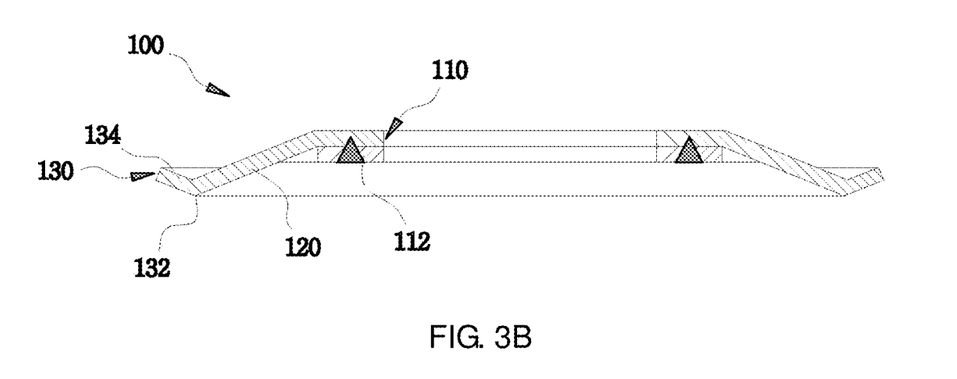
Figure 4A:
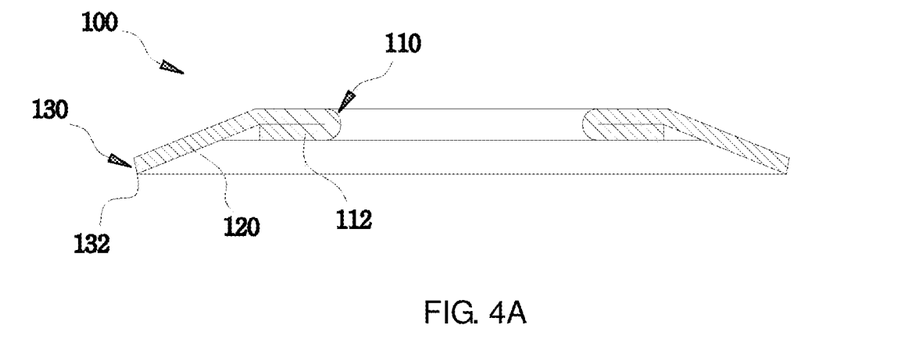
FIGS. 4A and 4B are cross-sectional views of a spring washer according to a second embodiment of the present invention.
Figure 4B:
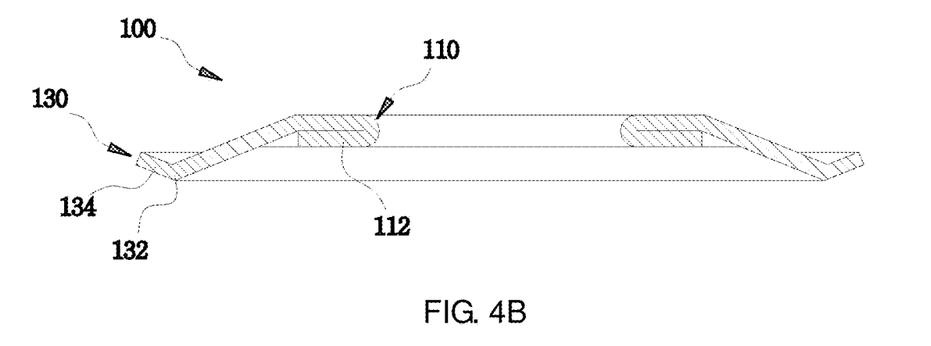
Figure 5A:
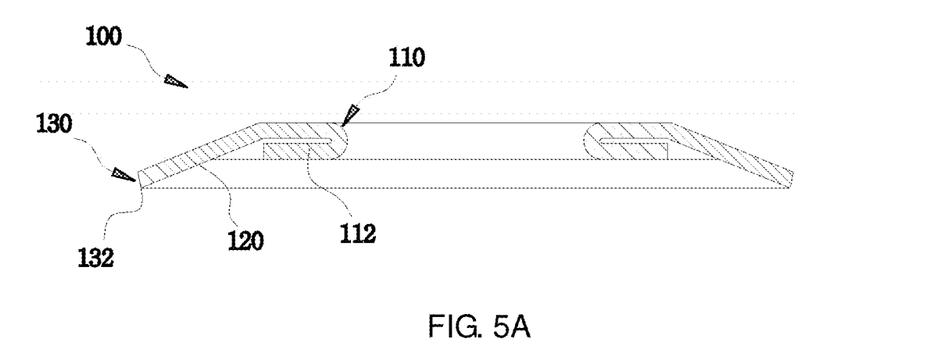
FIGS. 5A and 5B are cross-sectional views of a spring washer according to a third embodiment of the present invention.
Figure 5B:
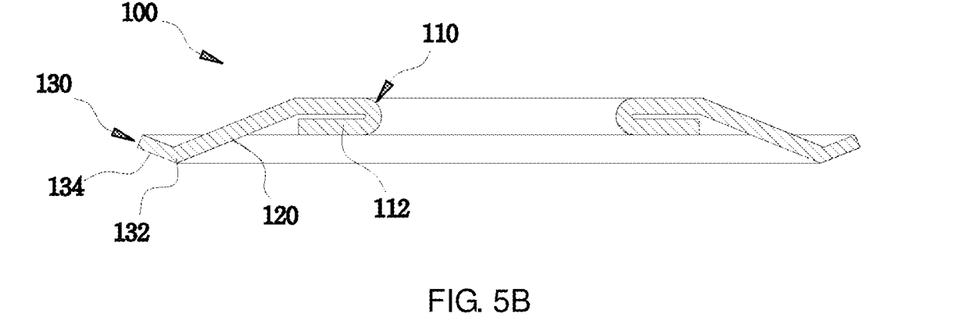

FIGS. 3A and 3B are cross-sectional views of a spring washer according to a first embodiment of the present invention, FIGS. 4A and 4B are cross-sectional views of a spring washer according to a second embodiment of the present invention, and FIGS. 5A and 5B are cross-sectional views of a spring washer according to a third embodiment of the present invention.

First, a typical turbocharger will be described with reference to FIGS. 1 and 2, and the same parts as the prior art will be denoted by the same reference numerals.

A turbocharger 1 includes a compressor housing 10, a turbine housing 20, an actuator 30, and a bypass valve 40 installed near the turbine housing 20 and connected to the actuator 30 by a link.

The respective housings 10 and 20 are disposed at a predetermined interval inside of the turbocharger 1 along a rotational shaft (not denoted by a reference numeral). The bypass valve 40 is disposed near the turbine housing 20 and is connected to the actuator 30 by a link so as to be operated.

The bypass valve 40 allows a part of an exhaust gas to bypass the turbine, thus to prevent the boost pressure from being increased beyond a constant range. The bypass valve 40 installed for this purpose selectively opens and closes a bypass flow path between exhaust gas inlet and outlet passages of the turbocharger, and includes a valve body 42, a support 44, and a washer unit 50.

The valve body 42 has an open/close plate 42a integrally formed at a lower end thereof to open and close the bypass flow path.

The support 44 is connected to the valve body 42, and a rotation end 44a extending from the valve body 42 is formed at one end thereof.

Herein, the spring washer 100 of the turbocharger according to the present invention is formed in a ring shape and is made of a metal material having elastic and heat resistance properties to limit a movement and a clearance of the support 44.

The spring washer 100 may generally include a ring-shaped flat inner periphery 110, an outer periphery 130, and an inclination bent section 120 formed between the inner periphery 110 and the outer periphery 130 to connect these peripheries with each other.

As shown in FIGS. 3 to 5, the spring washer 100 having the above-described configuration may include a stopper part 112 formed on a lower surface of the inner periphery 110 and a bent part 134 formed at an end of the outer periphery 130, so as to maintain a spring repulsive force at a certain level or more even when exerting excessive compression and continuous compression force from peripheral parts.

First Embodiment

As shown in FIG. 3A, a ring-shaped spring washer 100 according to the first embodiment of the present invention generally includes an inner periphery 110, an outer periphery 130, and an inclination bent section 120 formed between the inner periphery 110 and the outer periphery 130 to connect these peripheries with each other.

According to characteristics of the present invention, the inner periphery 110 preferably has a stopper part 112 fixed to a lower surface thereof in such a way that a piece of the same material as the inner periphery is overlapped by laminating in the same area, and then is welded thereto.

As shown in FIG. 3A, the stopper part 112 is laminated in one layer, but at least one or more layers may be laminated. Preferably, the welding may use electric welding, $CO_2$ welding, argon welding, and the like. The laminated stopper part 112 may be fixed to the lower surface of the inner periphery 110 by welding.

The inclination bent section 120, which is formed integrally with the inner periphery 110 by extending outward therefrom, may be a portion configured to integrally connect the inner periphery 110 and the outer periphery 130 with each other and provide a spring repulsive force like a leaf spring by having a height difference.

Therefore, the inclination bent section 120 is formed to be inclined from the inner periphery 110 to an outer downward side. At this time, an inclination degree of the inclination bent section 120 may be set so that the outer periphery 130 is positioned on the support 44 lower than the stopper part 112 of the inner periphery 110 when viewing from the same line of the plane.

In addition, the inclination bent section 120 integrally formed with the inner periphery 110 by extending therefrom has a line contact part 132 formed at one end thereof.

As compared with a conventional spring washer in which a flat section thereof is in surface contact with the support 44, the spring washer of the present invention is in line contact with the support 44 through the line contact part 132, such that it is possible to maintain or improve restoring characteristics of the inclination bent section 120.

Furthermore, as shown in FIG. 3B, the spring washer according to the present embodiment may further include a bent part 134 formed integrally with the line contact part 132 by extending therefrom with being bent upward. In this case, the bent part 134 may be formed in an obtuse angle range.

The bent part 134 may be integrally manufactured when manufacturing a mold, and may be subjected to bending in a constant degree, preferably, in a range exceeding 90 degrees, so as to allow the bent part 134 to be in line contact with the support 44.

Second Embodiment

Components of a spring washer according to the second embodiment of the present invention shown in FIG. 4A have the same configuration as those of the spring washer according to the first embodiment except for the shape of the stopper part 112, such that these components will be described by denoting the same reference numerals.

A ring-shaped spring washer 100 according to the second embodiment of the present invention may generally include an inner periphery 110, an outer periphery 130, and an inclination bent section 120 formed between the inner periphery 110 and the outer periphery 130 to connect these peripheries with each other.

According to characteristics of the present invention, the inner periphery 110 may have a stopper part 112 formed on a lower surface thereof in such a way that a portion extending therefrom is bent downward and is again bent at a right angle, so that an upper surface of the stopper part 112 is in close contact with the lower surface of the inner periphery 110.

That is, when manufacturing a mold, after preparing an annular plate to be the spring washer according to the present embodiment having a ring-shaped central hole with a smaller diameter than that of the first embodiment, an end side of the inner periphery 110 is bent inward to be rolled upward, and surfaces facing each other by bending are in close contact with each other by compression, so as to be overlapped with each other.

The inclination bent section 120, which is formed integrally with the inner periphery 110 by extending outward therefrom, may be a portion configured to integrally connect the inner periphery 110 and the outer periphery 130 with each other and provide a spring repulsive force like a leaf spring by having a height difference.

Therefore, the inclination bent section 120 is formed to be inclined from the inner periphery 110 to an outer downward side. At this time, an inclination degree of the inclination bent section 120 may be set so that the outer periphery 130 is positioned on the support 44 lower than the stopper part 112 of the inner periphery 110 when viewing from the same line of the plane.

In addition, the inclination bent section 120 integrally formed with the inner periphery 110 by extending therefrom has a line contact part 132 formed at one end thereof.

As compared with a conventional spring washer in which a flat section thereof is in surface contact with the support 44, the spring washer of the present invention is in line contact with the support 44 through the line contact part 132, such that it is possible to maintain or improve restoring characteristics of the inclination bent section 120.

Furthermore, as shown in FIG. 4B, the spring washer according to the present embodiment may further include a bent part 134 formed integrally with the line contact part 132 by extending therefrom with being bent upward. In this case, the bent part 134 may be formed in an obtuse angle range.

The bent part 134 may be integrally manufactured when manufacturing a mold, and may be subjected to bending in a constant degree, preferably, in a range exceeding 90 degrees, so as to allow the bent part 134 to be in line contact with the support 44.

Third Embodiment

Components of a spring washer according to the third embodiment of the present invention shown in FIG. 5A have the same configuration as those of the spring washer according to the first embodiment except for the shape of the stopper part 112, such that these components will be described by denoting the same reference numerals.

A ring-shaped spring washer 100 according to the third embodiment of the present invention may generally include an inner periphery 110, an outer periphery 130, and an inclination bent section 120 formed between the inner periphery 110 and the outer periphery 130 to connect these peripheries with each other.

According to characteristics of the present invention, the inner periphery 110 may have a stopper part 112 formed on a lower surface thereof with a gap in such a way that a portion extending therefrom is bent downward and is again bent at a right angle, so that an upper surface of the stopper part 112 faces the lower surface of the inner periphery 110 with being spaced apart therefrom.

That is, when manufacturing a mold, after preparing an annular plate to be the spring washer according to the present embodiment having a ring-shaped central hole with a smaller diameter than that of the first embodiment, an end side of the inner periphery 110 is bent inward to be rolled upward, and surfaces facing each other by bending come close to each other with a gap by compression. In this process, the inner periphery 110 and the stopper part 112 may be spaced apart from each other with the gap.

The inclination bent section 120, which is formed integrally with the inner periphery 110 by extending outward therefrom, may be a portion configured to integrally connect the inner periphery 110 and the outer periphery 130 with each other and provide a spring repulsive force like a leaf spring by having a height difference.

Therefore, the inclination bent section 120 is formed to be inclined from the inner periphery 110 to an outer downward side. At this time, an inclination degree of the inclination bent section 120 may be set so that the outer periphery 130 is positioned on the support 44 lower than the stopper part 112 of the inner periphery 110 when viewing from the same line of the plane.

In addition, the inclination bent section 120 integrally formed with the inner periphery 110 by extending therefrom has a line contact part 132 formed at one end thereof.

As compared with a conventional spring washer in which a flat section thereof is in surface contact with the support 44, the spring washer of the present invention is in line contact with the support 44 through the line contact part 132, such that it is possible to maintain or improve restoring characteristics of the inclination bent section 120.

Furthermore, as shown in FIG. 5B, the spring washer according to the present embodiment may further include a bent part 134 formed integrally with the line contact part 132 by extending therefrom with being bent upward. In this case, the bent part 134 may be formed in an obtuse angle range.

The bent part 134 may be integrally manufactured when manufacturing a mold, and may be subjected to bending in a constant degree, preferably, in a range exceeding 90 degrees, so as to allow the bent part 134 to be in line contact with the support 44.

An operation of the spring washer of the turbocharger having the above-described configuration according to the embodiments of the present invention will be described.

The spring washer 100 is mounted on the support (44 in FIG. 2) so as to limit a movement and a clearance thereof. According to the first, second and third embodiments of the present invention, the stopper part 112 is formed in the inner periphery 110, and the line contact part 132 capable of being in line contact with the support 44 and/or the bent part 134 are/is formed in the outer periphery 130.

Figure 6:
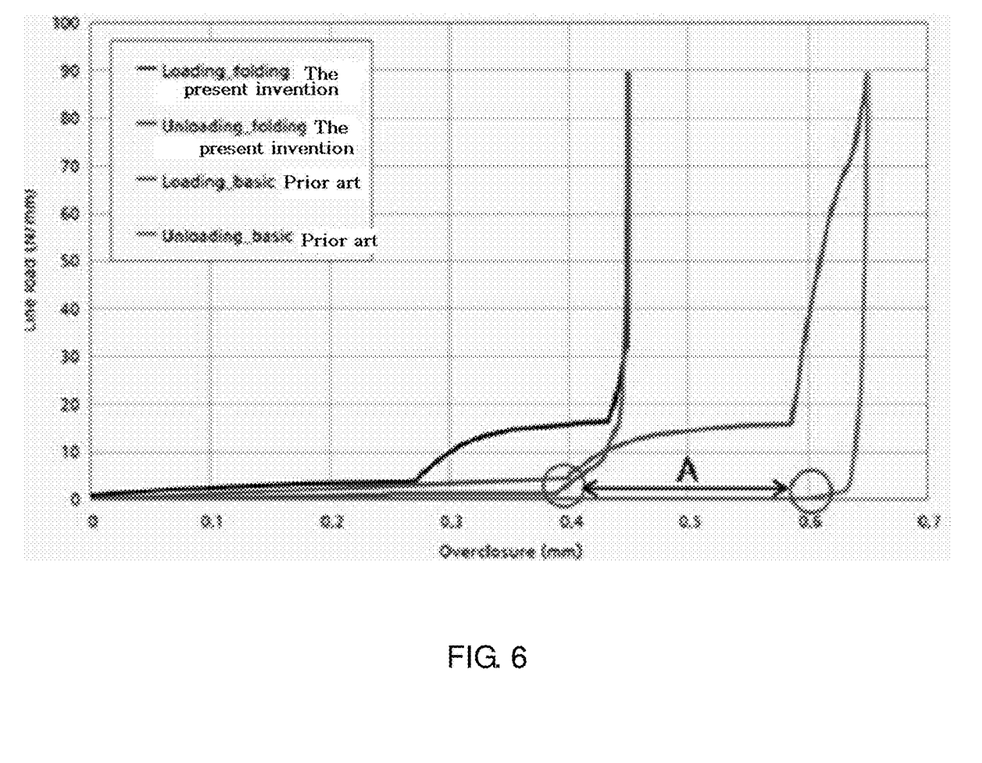
FIG. 6 is a graph illustrating compression characteristics of a bead.

Therefore, as shown in the graph of FIG. 6, the repulsive force is not exerted on the spring washer 100 more than necessary during the compression due to the stopper part 112, the line contact part 132, and the bent part 134. Further, during restoring, as compared with the conventional spring washer, by preventing the bent part 120 from being flattened as much as "A" section, it is possible to maintain or improve the restoring characteristics of the inclination bent section 120.

Furthermore, it is possible to maintain the restoring property of the inclination bent section 120 by allowing the spring washer 100 and the support 44 to be in line contact rather than surface contact like the conventional spring washer due to the line contact part 132.

As described above, in accordance with the spring washer of the turbocharger according to the embodiments of the present invention, even when exerting excessive compression and continuous compression force from peripheral parts, it is possible to maintain the spring repulsive force in a certain level or more due to the ring-shaped stopper part welded to the inner periphery or bent so as to be overlapped therewith and the line contact part.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

| Description of Reference Numerals | |
|---|---|
| 100: Spring washer | 110: Inner periphery |
| 112: Stopper part | 120: Inclination bent section |
| 130: Outer periphery | 132: line contact part |
| 134: Bent part | |

What is claimed is:

1. A ring-shaped spring washer installed in a bypass valve of a turbocharger, comprising:
   an inner periphery which has a stopper part bent and fixed to a lower surface thereof so as to be overlapped therewith;
   an inclination bent section which is integrally formed with the inner periphery by extending therefrom with being inclined downward; and
   an outer periphery which has a line contact part integrally formed with the inclination bent section by extending downward therefrom so as to be in line contact with and supported by a support of the spring washer,
   wherein the stopper part is fixed to the lower surface of the inner periphery in such a way that a piece of the same material as the inner periphery is laminated in the same area and is welded thereto.

2. The ring-shaped spring washer according to claim 1, further comprising a bent part which is formed integrally with the line contact part by extending therefrom with being bent upward.

3. The ring-shaped spring washer according to claim 2, wherein the bent part is formed in an obtuse angle range.

4. A ring-shaped spring washer installed in a bypass valve of a turbocharger, comprising:
   an inner periphery which has a stopper part formed on a lower surface thereof so as to be overlapped therewith;
   an inclination bent section which is integrally formed with the inner periphery by extending therefrom with being inclined downward; and
   an outer periphery which has a line contact part integrally formed with the inclination bent section by extending downward therefrom so as to be in line contact with and supported by a support of the spring washer,
   wherein the stopper part is formed on the lower surface of the inner periphery in such a way that a portion extending therefrom is bent downward and is again bent at a right angle, so that an upper surface of the stopper part is in close contact with the lower surface of the inner periphery.

5. The ring-shaped spring washer according to claim 4, further comprising a bent part which is formed integrally with the line contact part by extending therefrom with being bent upward.

6. The ring-shaped spring washer according to claim 5, wherein the bent part is formed in an obtuse angle range.

7. A ring-shaped spring washer installed in a bypass valve of a turbocharger, comprising:
   an inner periphery which has a stopper part formed on a lower surface thereof so as to be overlapped therewith;
   an inclination bent section which is integrally formed with the inner periphery by extending therefrom with being inclined downward; and
   an outer periphery which has a line contact part integrally formed with the inclination bent section by extending downward therefrom so as to be in line contact with and supported by a support of the spring washer,
   wherein the stopper part is formed on the lower surface of the inner periphery with a gap in such a way that a portion extending therefrom is bent downward and is again bent at a right angle, so that an upper surface of the stopper part faces the lower surface of the inner periphery with being spaced apart therefrom.

8. The ring-shaped spring washer according to claim 7, further comprising a bent part which is formed integrally with the line contact part by extending therefrom with being bent upward.

9. The ring-shaped spring washer according to claim 8, wherein the bent part is formed in an obtuse angle range.

* * * * *